No. 873,715. PATENTED DEC. 17, 1907.
C. BUSCH.
ELECTRICAL ACCUMULATOR.
APPLICATION FILED JUNE 25, 1907.
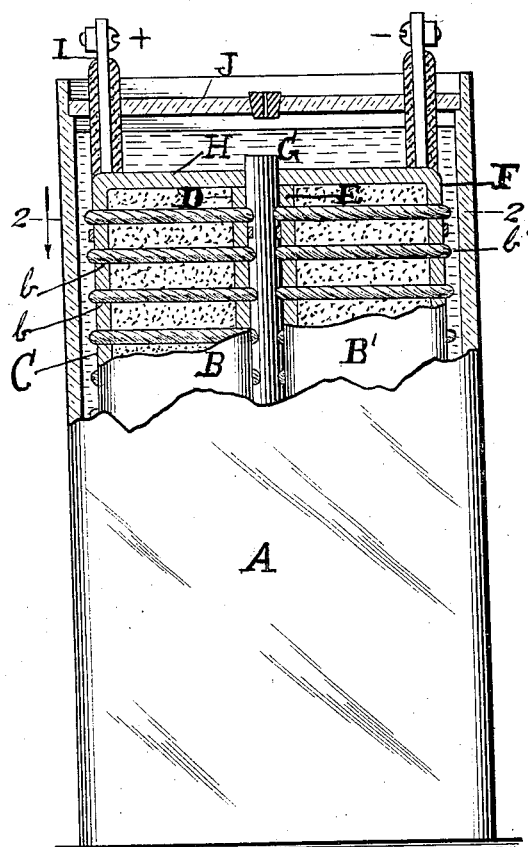
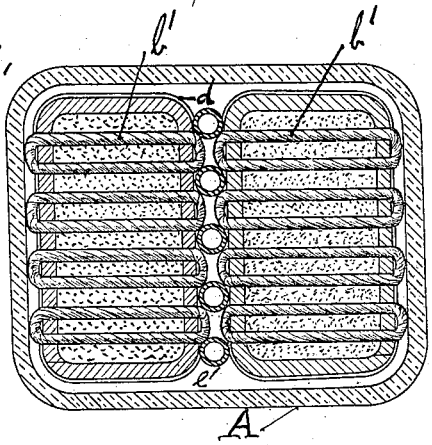
WITNESSES
Charles Busch, INVENTOR
BY Philip K. Stern.
his ATTORNEY

UNITED STATES PATENT OFFICE.

CHARLES BUSCH, OF NEW YORK, N. Y.

ELECTRICAL ACCUMULATOR.

No. 873,715.  Specification of Letters Patent.  Patented Dec. 17, 1907.

Application filed June 25, 1907. Serial No. 380,674.

*To all whom it may concern:*

Be it known that I, CHARLES BUSCH, a citizen of the United States, residing in the city of New York, county of New York, and State of New York, have invented certain new and useful Improvements in Electrical Accumulators, of which the following is a specification.

My invention in electrical accumulators relates to that type employing a lead salt usually an oxid as the active material in contact with lead electrodes.

Heretofore and previous to my invention, electrical accumulators of this type have been in vogue wherein the active material has been usually contained in a lead support or a support consisting of an alloy containing lead which usually assumed the form of a grid or matrix, and were arranged in such a manner within a containing vessel, and an electrolyte carried therein as to expose opposing surfaces to the action of electrolysis when the accumulator was in action. The active material on the surface of the electrodes after a series of chemical changes having been reduced during the discharging operation to a lower degree of oxidation and upon the charging thereafter to a higher degree of oxidation began its activity at the surface of the supports and the chemical changes which took place in the active material during these operations were progressive from the exterior as aforesaid to greater depths within the mass of active material during the operation of chemical activity. These chemical changes were usually accompanied by changes in volume of the active material within the grid or matrix which latter did not expand and contract in unison, and in consequence thereof, the active material became loosened from the support which resulted in the disintegration and precipitation of the active material and finally in the breaking down of the accumulator.

It is the object of my invention to circumvent these difficulties while at the same time provide a form of accumulator cell which for a given quantity of material and for a given weight thereof, will have a considerable increased capacity, while at the same time to provide one which will have a greater maximum discharge rate than any of those heretofore in vogue, embraced by this class, in so far as I am at present aware, and the manner whereby I attain these objects is illustrated in the drawings hereto attached which form part of this specification, wherein, Figure 1, illustrates a front, elevational view of an accumulator cell embodying my invention with the upper portion thereof removed, showing the electrodes and the containing vessel partially in section, and Fig. 2 is a transverse section of the same taken on the line 2—2 of Fig. 1.

In both views, similar characters of reference are employed to designate like parts, wherein, A depicts the usual type of battery jar, which is of glass, celluloid, rubber or any other suitable non-conducting material which is acid proof.

Within the jar A are my improved electrodes B and B', which are preferably composed of chemically pure rolled sheet lead or a lead alloy containing not over 2% of antimony. These are preferably formed in the manner of rectangular tubes with slightly rounded corners as illustrated in Fig. 2, folded in the manner of a closed box from sheet metal, so as to assume the tubular formation as illustrated more particularly in Fig. 2. One of these electrodes B is employed as an anode and the other B' as a cathode. Prior to the formation of the electrodes by the folding of the metal into the form of the respective boxes B and B' as aforesaid, I perforate the two opposite surfaces of each electrode, namely the surfaces, C and D of the electrode B and the surfaces E and F of the electrode B', whereby upon the formation of the said electrodes and their being positioned as illustrated in Figs. 1 and 2, the perforated surfaces E of the electrodes B' will be opposite the perforated surfaces of the electrode B. The aforesaid perforations are for the purpose of permitting a free circulation of the electrolyte G, which is preferably composed of one part $H_2SO_4$ to three parts $H_2O$, to and through the interior of the electrodes B and B'.

The anode B is provided with an interior active material composed of two parts $PbO_2$ and one part PbO which is primarily in the dry powdered form. I mix this with a solution of ammonium sulfate and water or glycerin or a weak solution of sulfuric acid and water depending upon whether the material is to be transported without the electrolyte or whether the cell containing the electrodes is to be employed after its formation. In the former instance I have found that ammonium sulfate when mixed with these oxids of lead, in order to reduce them to a paste is less subject to sulfating when dry and exposed to the atmosphere than when sulfuric acid and water is employed in lieu thereof, while for general purposes, I have found glycerin to serve as a substitute for either. The aforesaid oxids of lead, after being mixed with either of the aforesaid solutions to the consistency of a paste is placed into the anode B, prior to the folding down of the cover plate H, after which the latter is closed down in the manner illustrated in Fig. 1.

In order to provide for a circulation of the electrolyte through the anode B, I string capillary material through the perforations $b$ for which material I prefer to employ pure undyed white animal wool, and pass the same through the perforation $b$ by means of a suitable needle, so as to form substantially a series of loops $b'$ as illustrated more clearly in Fig. 2. When a sufficient amount of the said wool is passed through the perforations $b$ in the manner aforesaid, to tightly pack the latter, the tension of the fibers of the strands of wool, will prevent the opposite walls C and D of the anode B from bulging excessively due to the expansion of the active material contained therein, and thus will serve the purpose of bands to further maintain the integrity of the anode B. I provide a plurality of elastic bands $d$, embracing the outer walls of the anode B at longitudinal intervals. These are preferably composed of a suitable grade of rubber.

The construction of the electrode B' which is disposed as a cathode is precisely similar to that described for the anode B with the exception that the capacity of the cathode for active material is made greater than the anode preferably $\frac{1}{3}$ and is filled with paste similar to that of the anode excepting that the oxid consists of a mixture of one part $PbO_2$ and two parts $PbO$.

In order to separate the anode B from the cathode B', I employ a series of glass or hard rubber tubes $e$ disposed as illustrated in Fig. 2, between the perforations in the opposing walls of the electrodes. This is a well-known expedient and it is thought requires no further description.

In the formation of the leaden boxes constituting the anode B and the cathode B', a portion of the lead is cut away from the cover H and is turned up to form a pole connection as is illustrated at I. This is preferably insulated with wax or rubber to prevent electrolytic action, and is carried through the cover J of the jar as illustrated in Fig. 1. The − pole is similarly constructed and requires no further description.

The circulation of electrolyte throughout the mass of active material of my improved accumulator is effected through the envelop by means of the capillary elements which pass through the walls of the envelop and enter the mass of active material within and then effect communication with the exterior by extending through the envelop thereafter. The principle upon which the activity of the cell depends is involved in a series of local actions which have their origin at the surface of the envelop or electrode of both anode and cathode. In charging, this effect will be manifest by the counter E. M. F which is set up in the process of peroxidation when the base of chemical activity will be shifted gradually from points of higher oxidation to points of lower oxidation within the mass of active material until finally, due to compensation, the entire mass will be in chemical equilibrium. It is during this action that the capillary material plays a most important part in conveying the electrolyte from the exterior of the enveloped mass of active material to points where positive and negative ions are being exchanged and united during electrolysis. The replenishing of water and sulfuric acid is essential to the chemical decomposition and recomposition taking place and in fact, this distribution must precede any chemical change in the active material.

During electro chemical analysis and synthesis, there will be considerable local action in the active material of the anode as well as in the cathode accompanied by sulfating and a reduction of the sulfate back into oxid, and upon discharging the action obviously will be reversed.

I have found in practice, that short circuiting or over-charging does not have any deleterious effect on the active material or the support therefor, and in discharging so that the peroxid becomes critically reduced throughout the mass, it appears to be readily recovered by a number of charges and reversals. By the contracting effect of the elastic rubber bands together with the tension of the woolen strands on the opposite walls of the respective electrodes, contact between the support of the active material is continually maintained during the subsequent expansion and final contraction of the active material.

Having fully described my invention, I claim as new and desire to secure by Letters Patent of the U. S.

1. In an electrical accumulator, electrodes consisting of metallic boxes, active material contained therein, said boxes enveloping the active material, perforations in opposite walls of the boxes and capillary material strung through the perforations sinuously in said walls and through the active material contained in the boxes.

2. In an electrical accumulator, an element consisting of a metallic envelop formed of a sheet of substantially non-corrosive metal folded so as to form a tube, active material contained within the said tube and the ends of the said envelop folded in so as to inclose the said active material, perforations in the walls of the envelop and a capillary lacing passing through the perforations and uniting the opposite walls in the manner of a sinuous winding.

In testimony whereof, I have signed my name to this specification in the presence of two subscribing witnesses.

CHARLES BUSCH.

Witnesses:
EDUARD WEIMAR,
CHAS. W. BUSCH, Jr.